(12) United States Patent  
Takeuchi et al.

(10) Patent No.: US 8,308,071 B2
(45) Date of Patent: Nov. 13, 2012

(54) RFID TAG AND MANUFACTURING METHOD THEREOF

(75) Inventors: Shuichi Takeuchi, Kawasaki (JP); Kenji Kobae, Kawasaki (JP); Takayoshi Matsumura, Kawasaki (JP); Tetsuya Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 310 days.

(21) Appl. No.: 12/756,487

(22) Filed: Apr. 8, 2010

(65) Prior Publication Data

US 2010/0258640 A1 Oct. 14, 2010

(30) Foreign Application Priority Data

Apr. 14, 2009 (JP) .................................. 2009-098360

(51) Int. Cl.
*G06K 19/06* (2006.01)

(52) U.S. Cl. ...................................................... 235/492

(58) Field of Classification Search .................. 235/492, 235/380, 487, 488; 156/60
See application file for complete search history.

(56) References Cited

U.S. PATENT DOCUMENTS

2009/0020613 A1* 1/2009 Chang et al. .................. 235/492

FOREIGN PATENT DOCUMENTS

| JP | 11-102424 A | 4/1999 |
| JP | 3071033 U | 8/2000 |
| JP | 2007-272748 A | 10/2007 |
| JP | 2008-097426 A | 4/2008 |
| JP | 2010079801 A * | 4/2010 |

* cited by examiner

*Primary Examiner* — Seung Lee
(74) *Attorney, Agent, or Firm* — Westerman, Hattori, Daniels & Adrian, LLP

(57) ABSTRACT

An RFID tag includes an inlet on which an antenna pattern serving as an antenna for communication and an IC chip electrically connected to the antenna pattern are mounted. The RFID tag also includes an exterior body that encloses the inlet from outside and a hollow space that is formed by the inlet and the exterior body and that is filled with gas or a gel material.

6 Claims, 6 Drawing Sheets

RFID TAG AND MANUFACTURING METHOD THEREOF

CROSS-REFERENCE TO RELATED APPLICATION

This application is based upon and claims the benefit of priority from Japanese Patent Application No. 20 09-098360, filed on Apr. 14, 2009, the entire contents of which are incorporated herein by reference.

FIELD

The embodiments discussed herein are directed to an RFID tag and a manufacturing method thereof.

BACKGROUND

In recent years, radio frequency identification (RFID) tags such as contactless IC smart cards are in use. The RFID tags receive power supply and information from external devices such as reader/writers and send information to the external devices in a contactless manner via radio waves.

An RFID tag includes an integrated circuit (IC) chip and an antenna in an embedded form inside a card shape. The RFID tag can read information from or write information into a reader/writer in a contactless manner via radio waves.

As an already existing application, the RFID tags are used in, for example, a physical distribution management system (using linen tags) for managing articles of clothing such as uniforms. It is necessary for such linen tags to preserve the feel of clothes when put on and to have a certain level of strength.

More particularly, since an RFID tag that is attached to an article of clothing gets washed without being removed from that article of clothing, it is necessary for the RFID tag to be able to withstand the bending stress that acts thereon during washing.

In order to maintain the strength and durability of an RFID tag, the exterior body of an inlet disposed therein needs to have a rigid structure. However, on the negative side, the rigid structure of the inlet affects the wear comfort of the clothing.

In a typical RFID tag used as a linen tag, an inlet disposed inside the RFID tag is enclosed with urethane or the like. However, if such an RFID tag happens to bend during washing, then the bending stress acts directly on the inlet thereby causing disconnection of an antenna pattern mounted thereon.

In regard to the problem regarding the strength of RFID tags, Japanese Unexamined Utility Model Application Publication No. 2000-733 discloses a technology in which an antenna substrate in an RFID tag is protected with a pair of a upper film and a lower film that are made of fluorine contained resin.

Moreover, Japanese Laid-open Patent Publication No. 11-102424 discloses a technology in which a gelled resin is filled in the inside part of an RFID tag and the inside part is covered with an exterior cladding so that the RFID tag is prevented from stress deformation.

Furthermore, Japanese Laid-open Patent Publication No. 2007-272748 discloses a technology of strengthening an IC chip in an RFID tag by covering the IC chip with a hardening adhesive film.

Moreover, Japanese Laid-open Patent Publication No. 2008-97426 discloses a technology in which a foam polystyrene plate is sandwiched between the inlet in an RFID tag and a metal plate having a slit formed thereon so that the inlet is protected from unnecessary external force.

However, following problems occur in the RFID tags manufactured using the conventional technology. Consider the case of an RFID tag manufactured using the technology disclosed in Japanese Unexamined Utility Model Application Publication No. 2000-000733. In that case, although the antenna substrate in the RFID tag is protected with a pair of an upper film and a lower film of fluorine contained resin; it is not possible for the fluorine contained resin to prevent the external force from propagating to the antenna substrate. That makes the antenna substrate vulnerable to damage.

In the case of Japanese Laid-open Patent Publication No. 11-102424, although the gelled resin filled in the inside part of an RFID tag enables preventing the RFID tag from stress deformation; it is not possible to prevent deformation of the antenna substrate.

In the case of Japanese Laid-open Patent Publication No. 2007-272748, although an IC chip is strengthened by covering it with a hardening adhesive film; it is not possible to protect the antenna substrate inside the corresponding RFID tag.

In the case of Japanese Laid-open Patent Publication No. 2008-97426, although the metal plate having a slit formed thereon gets twisted so that the inlet is protected from unnecessary external force; the same reinforcement does not necessarily work against bending.

SUMMARY

According to an aspect of an embodiment of the present invention, an RFID tag includes an inlet on which an antenna pattern serving as an antenna for communication and an IC chip electrically connected to the antenna pattern are mounted; an exterior body that encloses the inlet from outside; and a joining unit that joins the inlet and the exterior body, a hollow space being formed by the inlet and the exterior body and being filled with either one of gas and a gel material.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT(S)

Preferred embodiments of the present invention will be explained with reference to accompanying drawings. The present invention is not limited to a first embodiment.

[a] First Embodiment

Figure 1:
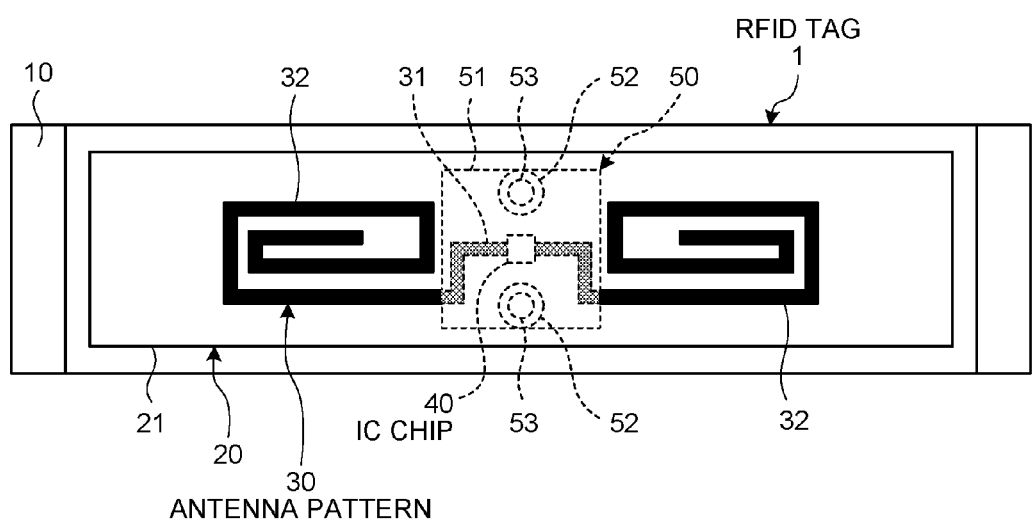
FIG. 1 is a plan view of an RFID tag 1 according to a first embodiment.
Figure 2:
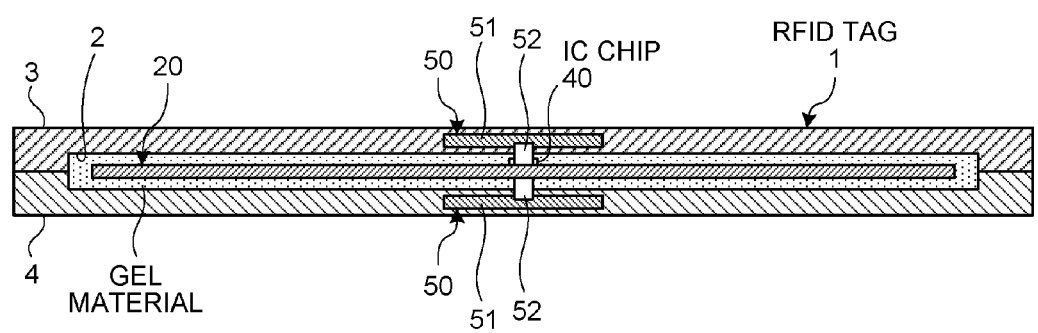
FIG. 2 is a longitudinal sectional view of the RFID tag illustrated in FIG. 1.

Firstly, the explanation is given about an overall configuration of an RFID tag 1 according to the first embodiment. FIG. 1 is a plan view of the RFID tag 1 according to the first embodiment. FIG. 2 is a longitudinal sectional view of the RFID tag 1 illustrated in FIG. 1.

As illustrated in FIGS. 1 and 2, the RFID tag 1 according to the first embodiment includes an exterior body 10 of an elongated quadrilateral (rectangular solid) shape and an inlet 20 that is disposed in a hollow space 2 inside the exterior body 10.

Besides, the RFID tag 1 includes an antenna pattern 30 that serves as a loop antenna for communication on the front surface of the inlet 20 and an IC chip 40 that is electrically-connected at substantially the central part of the antenna pattern 30.

The hollow space 2 inside the exterior body 10 is filled with a soft gel material having silicon as the primary material (e.g., αGEL (registered trademark)). Meanwhile, the exterior body 10 illustrated in FIG. 1 is manufactured by joining both ends of an upper exterior body 3 (see FIG. 2) with both ends of a lower exterior body 4 (see FIG. 2).

To protect the IC chip 40 disposed in the antenna pattern 30 on the inlet 20, a pair of guard plates 50 is disposed in the upper part and in the lower part at the substantially central portion of the inlet 20. The details regarding the pair of guard plates 50 are given later.

Thus, in the RFID tag 1 according to the first embodiment, the exterior body 10 is configured to be the housing for the RFID tag 1 with the hollow space 2 formed therein. The inlet 20 is disposed in the hollow space 2. Such a configuration enables securing a degree of freedom for the inlet 20 so that, even if an external force causes some bending stress to act on the RFID tag 1, the antenna pattern 30 on the inlet 20 is prevented from getting disconnected.

More particularly, even if the RFID tag 1 undergoes deformation due to an external force and encounters some bending stress, the bending stress does not easily propagate to the antenna pattern 30. That is, in the first embodiment, the inlet 20 is not joined to the inside part of the exterior body 10 so that it becomes possible to secure a degree of freedom for the inlet 20 inside the exterior body 10 of the RFID tag 1.

The inlet 20 includes an elongated main body 21 and is manufactured from a sophisticated special film such as a polyethylene terephthalate (PET) film or a polyethylene naphthalate (PEN) film having high mechanical strength, heat resistance, and hydrolysis resistance.

The inlet 20 is configured to have a slightly smaller width dimension than the width dimension of the hollow space 2 formed inside the exterior body 10. Meanwhile, as the inlet 20, it is also possible to use a high-frequency substrate material made of a resin including a dielectric substrate or glass having predetermined electric permittivity.

On the surface of the inlet 20 is formed the antenna pattern 30 that is a pattern formed on a conductive foil. The antenna pattern 30 includes an antenna wiring portion 31 that is formed linearly in the longitudinal direction and two antenna wiring portions 32 that are connected to the tips of the antenna wiring portion 31 and that are spirally wound for a plurality of times. The IC chip 40 is disposed at substantially the central part of the antenna wiring portion 31 of the antenna pattern 30.

Alternatively, the antenna pattern 30 can be formed on the inlet 20 by a side surface conduction method using plating or by etching a conducting body (e.g., metallic conductor such as copper).

The IC chip 40 includes a communication circuit (not illustrated) for recording and reading information in a contactless manner, a memory (not illustrated), a predetermined control circuit (not illustrated), and an electrode (not illustrated) for establishing electrical connection with the antenna pattern.

At the positions above and beneath the IC chip 40 that is disposed in the central part of the inlet 20 (i.e., at the top and bottom in FIG. 2) are disposed the guard plates 50 as reinforcing plates for protecting the IC chip 40, which is disposed in the antenna pattern 30 on the inlet 20.

To each guard plate 50 is fixed a pair of columns 52. For that reason, even if an external force acts from outside, the inlet 20 is prevented from moving to another position in the horizontal direction (left-right direction in FIG. 2) within the inside part (hollow space 2) of the exterior body 10 filled with a gel material.

Figure 3:
FIG. 3 is a side view of a guard plate illustrated in FIG. 1.

Each guard plate 50 includes a main plate portion 51 to which the corresponding pair of columns 52 is attached. More particularly, each pair of columns 52 is fixed at the substantial center of the main plate portion 51 of the corresponding guard plate 50. In each pair of columns 52, the tip of one of the columns 52 (left side in FIG. 3) is configured to have a salient 53 (left side in FIG. 3) and the tip of the other column 52 (right side in FIG. 3) is configured to have a recess 54 (right side in FIG. 3).

The salient 53 of each column 52 integrally fits into the recess 54 of the other column 52. Because of that, the pair of columns 52 functions as the support structure for the inlet 20 and as a post that performs inlet positioning with respect to the horizontal direction of the inlet 20 inside the exterior body 10.

As described above, in the RFID tag 1 according to the first embodiment, the inlet 20 that has the antenna pattern 30 mounted thereon is disposed in the hollow space 2 inside the exterior body 10 filled with a gel material. Thus, even if an external force acts on the RFID tag 1, the bending stress acting on the inlet 20 can be eased up. Hence, the antenna pattern 30 in the RFID tag 1 is prevented from getting disconnected.

[b] Second Embodiment

Figure 4:
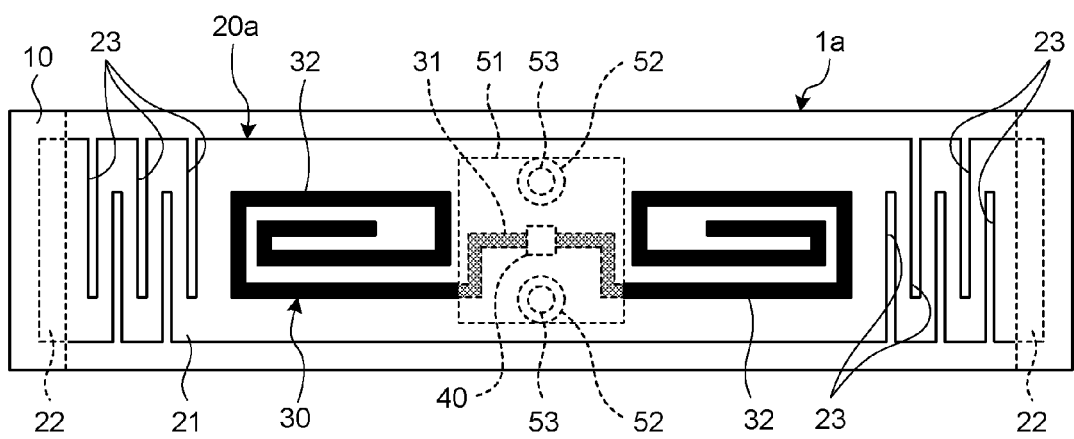
FIG. 4 is a plan view of an RFID tag according to a second embodiment.
Figure 5:
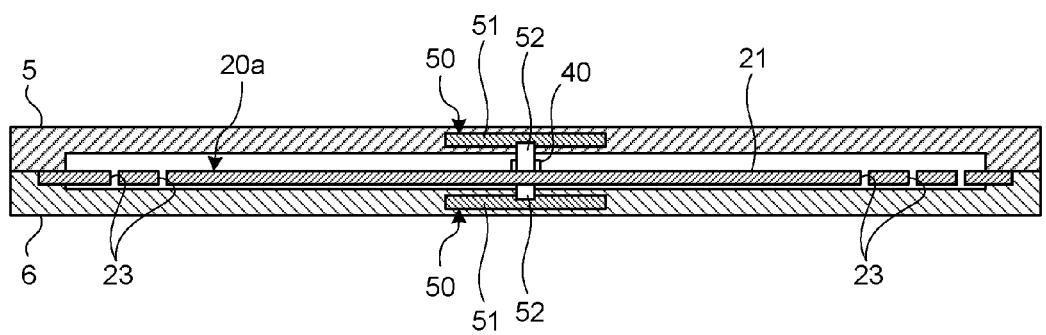
FIG. 5 is a longitudinal sectional view of the RFID tag illustrated in FIG. 4.

Given below is the description about a configuration of an RFID tag 1a according to a second embodiment. FIG. 4 is a plan view of the RFID tag 1a according to the second embodiment. FIG. 5 is a longitudinal sectional view of the RFID tag 1a illustrated in FIG. 4. Herein, regarding the reference numerals representing the constituent elements identical to those in the first embodiment, the detailed explanation is not repeated.

As illustrated in FIGS. 4 and 5, the RFID tag 1a includes the exterior body 10 that has an elongated quadrilateral shape, an inlet 20a that is disposed in a hollow space inside the exterior body 10, the IC chip 40 that is fixed at substantially the central part of the inlet 20a, and the antenna pattern 30. The exterior body 10 in the RFID tag 1a is manufactured by joining the ends of an upper exterior body 5 with the ends of a lower exterior body 6. The hollow space is formed by the upper exterior body 5 and the lower exterior body 6. In other words, the hollow space is filled with gas.

On each end of the main body 21 of the inlet 20a is formed an extended portion 22 that is joined within the hollow portion inside the exterior body 10. More particularly, each extended portion 22 is joined by sandwiching it between the corresponding ends of the upper exterior body 5 and the lower exterior body 6.

As illustrated in FIGS. 4 and 5, in the RFID tag 1a according to the second embodiment, each end of the inlet 20a has a plurality of slits 23 formed as notches.

More particularly, as illustrated in FIGS. 4 and 5, the plurality of slits (notches) 23 are formed on both ends (left and right sides in FIG. 2) in the width direction (longitudinal direction in FIG. 2) of the inlet 20a. The slits 23 are alternately notched partway from opposite sides (in vertical direction in FIG. 1) of the main body 21 of the inlet 20a.

In this way, by forming the slits 23 on both ends of the inlet 20a, it becomes possible to reduce the bending stress acting on the inlet 20a and thus prevent disconnection of the antenna pattern 30.

As described above, in the RFID tag 1a according to the second embodiment, the inlet 20a is disposed in the hollow space inside the exterior body 10 filled with a gel material and has the plurality of slits 23 formed as notches on both ends. Thus, even if an external force acts on the RFID tag 1a, the bending stress acting on the inlet 20a can be eased up. Hence, the antenna pattern 30 in the RFID tag 1a can be reliably prevented from getting disconnected.

[c] Third Embodiment

Figure 6:
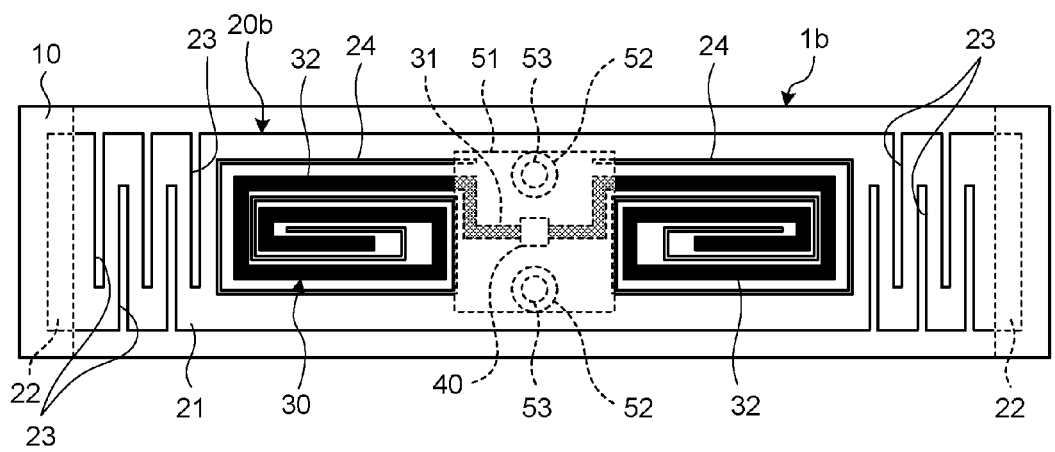
FIG. 6 is a plan view of an RFID tag according to a third embodiment.

Given below is the description about an overall configuration of an RFID tag 1b according to a third embodiment. FIG. 6 is a plan view of the RFID tag 1b according to the third embodiment. The RFID tag 1b according to the third embodiment differs from the RFID tag 1a according to the second embodiment in the fact that, apart from the slits formed on both ends of an inlet 20b, slits 24 are formed around the antenna pattern 30.

As illustrated in FIG. 6, the RFID tag 1b includes the exterior body 10 that has an elongated quadrilateral shape, the inlet 20b that is disposed in the hollow space inside the exterior body 10, the IC chip 40 that is fixed at substantially the central part of the inlet 20b, and the antenna pattern 30.

Besides, as illustrated in FIG. 6, in the RFID tag 1b according to the third embodiments, each end of the inlet 20b has the plurality of slits 23 formed as notches in an identical manner to the second embodiment. Apart from the slits 23, the slits 24 are formed as notches around the antenna pattern 30.

More particularly, from among the antenna wiring portion 31 that is formed linearly in the longitudinal direction of the antenna pattern 30 on the inlet 20b and the antenna wiring portions 32 that are connected to the tips of the antenna wiring portion 31 and that are spirally wound for a plurality of times, the slits 24 are formed as notches around the two antenna wiring portions 32 as illustrated in FIG. 6.

Thus, by notching the slits 24 to cover the periphery of the antenna wiring portions 32 that constitute the arrangement region for the antenna pattern 30, it becomes possible to secure a greater degree of freedom for the inlet 20b inside the RFID tag 1b.

As described above, in the RFID tag 1b according to the third embodiment, the slits 24 are formed as notches around the two the antenna wiring portions 32 of the antenna pattern 30 in the RFID tag 1b. Thus, even if an external force acts on the RFID tag 1b, the bending stress acting on the inlet 20b can be eased up. Hence, the antenna pattern 30 in the RFID tag 1b can be reliably prevented from getting disconnected.

Manufacturing Method of RFID Tag

Figure 7:
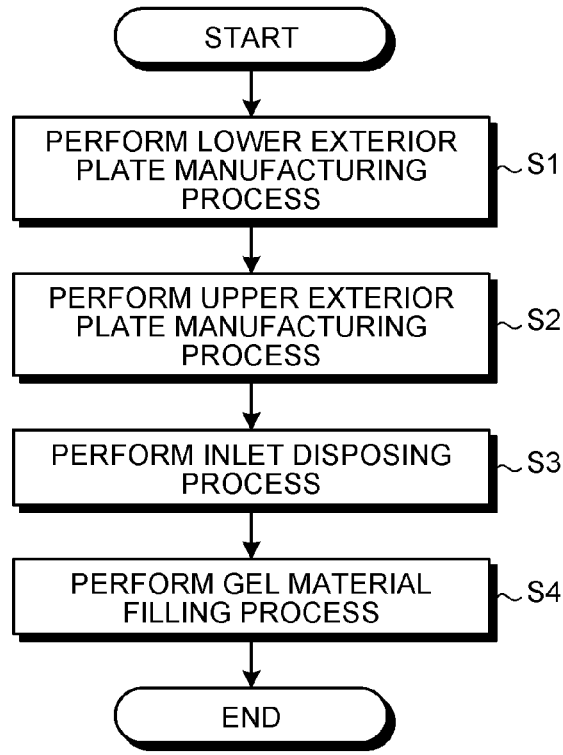
FIG. 7 is a flowchart for explaining the processes in a manufacturing method of an RFID tag.

Given below is the description with reference to FIG. 7 and FIGS. 8 to 12 about a manufacturing method of the RFID tag according to the first embodiment. FIG. 7 is a flowchart for explaining the processes in the manufacturing method of the RFID tag according to the first embodiment. FIGS. 8 to 12 are explanatory diagram for explaining the processes in the manufacturing method of the RFID tag.

As illustrated in the flowchart in FIG. 7, the manufacturing method of the RFID tag 1 implemented by a manufacturing system includes a lower exterior plate manufacturing process, an upper exterior plate manufacturing process, an inlet disposing process, and a gel material filling process performed in that order.

As illustrated in the flowchart in FIG. 7, first, a manufacturing system according to the first embodiment performs the lower exterior plate manufacturing process to manufacture a lower exterior plate (Step S1). From among an upper exterior plate 8 and a lower exterior plate 7 constituting the exterior body 10 of the RFID tag 1 (see FIG. 1), the lower exterior plate manufacturing process is performed to manufacture the lower exterior plate 7.

That is, the exterior body 10 of the RFID tag 1 (see FIG. 1) can be manufactured with the upper exterior plate 8 and the lower exterior plate 7. The exterior body 10 is manufactured by joining both ends of the upper exterior plate 8 with both ends of the lower exterior plate 7 (left and right ends in FIG. 1). The lower exterior plate 7 (see FIG. 8) is manufactured by fitting together an outer plate member 7a and an inner plate member 7b.

Figure 8:
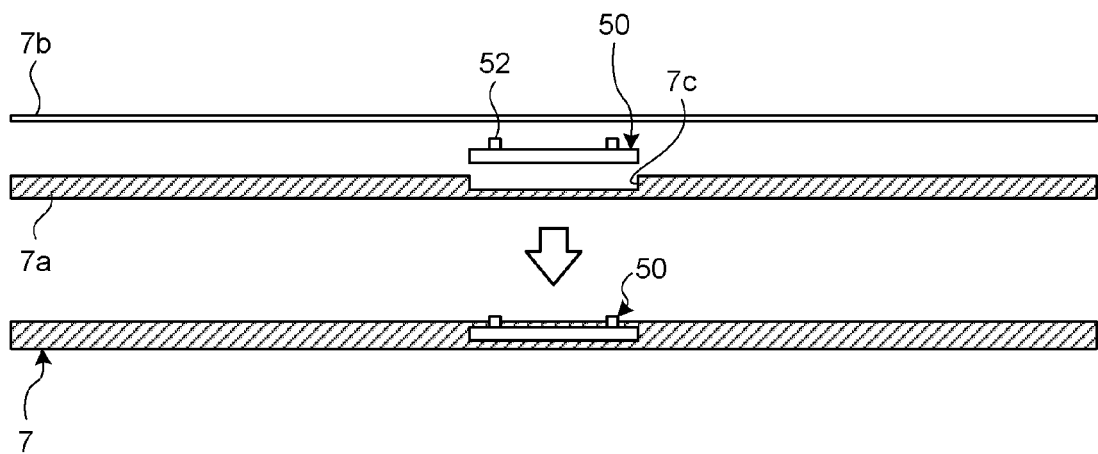
FIGS. 8 to 12 are explanatory diagram for explaining the processes in the manufacturing method of an RFID tag.

More particularly, as illustrated in FIG. 8, the outer plate member 7a and are inner plate member 7b are manufactured in tabular shape. Then, in a depressed portion 7c of the tabular outer plate member 7a, the bottom surface of the main plate portion 51 of the guard plate 50 is fixedly attached. The inner plate member 7b is joined on the top surface of the outer plate member 7a having the guard plate 50 fixed thereto.

At that time, the pair of columns 52 on the guard plate 50 pass through a pair of holes (not illustrated) formed in the substantially central part of the inner plate member 7b. Because of that, the guard plate 50 gets joined with the outer plate member 7a and the inner plate member 7b.

Subsequently, as illustrated in the flowchart in FIG. 7, the manufacturing system according to the first embodiment performs the upper exterior plate manufacturing process to manufacture an upper exterior plate (Step S2). From among the upper exterior plate 8 and the lower exterior plate 7 constituting the exterior body 10 of the RFID tag 1, the upper exterior plate manufacturing process is performed to manufacture the upper exterior plate 8.

Figure 9:
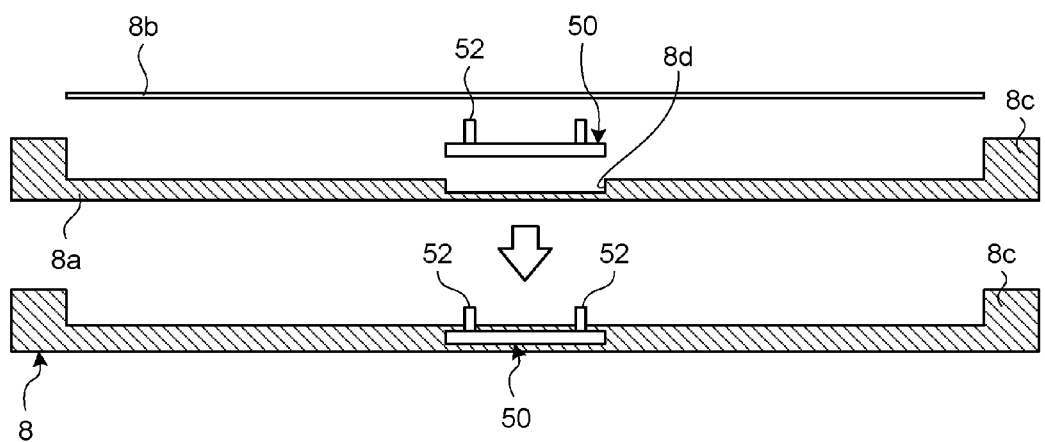

As illustrated in FIG. 9, the upper exterior plate 8 is manufactured by fitting together an outer plate member 8a that is tabular and that has a bend portion 8c bending toward one side (upward in FIG. 9) and an inner plate member 8b that is tabular in shape.

More particularly, in a depressed portion 8d of the outer plate member 8a, the bottom surface of the main plate portion 51 of the guard plate 50 is fixedly attached. Then, the inner plate member 8b is joined on the top surface of the outer plate member 8a having the guard plate 50 is fixed thereto. At that time, the pair of columns 52 on the guard plate 50 pass through a pair of holes (not illustrated) formed in the substantially central part of the inner plate member 8b. Because of that, the guard plate 50 gets joined with the outer plate member 8a and the inner plate member 8b.

Subsequently, as illustrated in the flowchart in FIG. 7, the manufacturing system according to the first embodiment performs the inlet disposing process to dispose the inlet 20 (Step S3). The inlet disposing process is performed to dispose the inlet 20 inside the exterior body 10 of the RFID tag.

Figure 10:
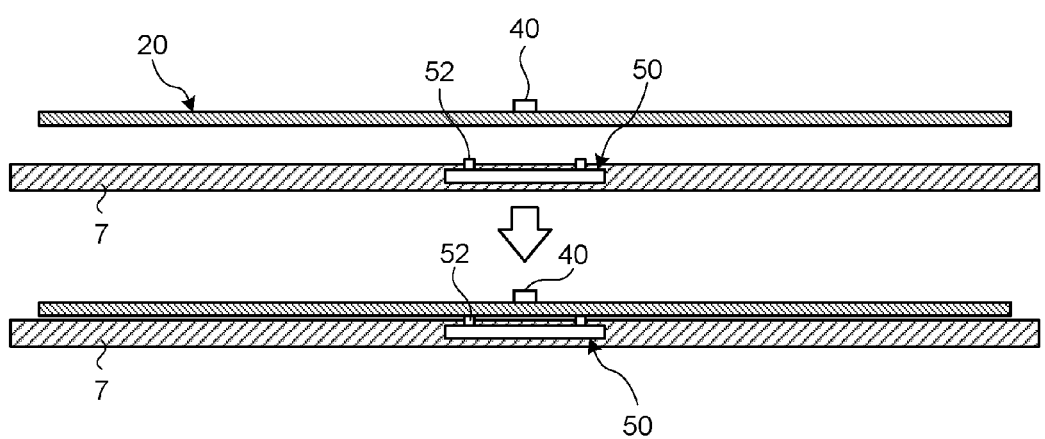

More particularly, as illustrated in FIG. 10, the inlet 20 having the IC chip 40 fixed thereto is mounted on the top surface of the lower exterior plate 7 manufactured as described with reference to FIG. 7. The inlet 20 is bonded to the lower exterior plate 7 with an adhesive.

Subsequently, as illustrated in the flowchart in FIG. 7, the manufacturing system according to the first embodiment performs the gel material filling process to fill a gel material inside the RFID tag 1 (Step S4). The gel material filling process is performed to fill a gel material in the inside part of the hollow space 2 inside the exterior body 10 of the RFID tag 1.

Figure 11:
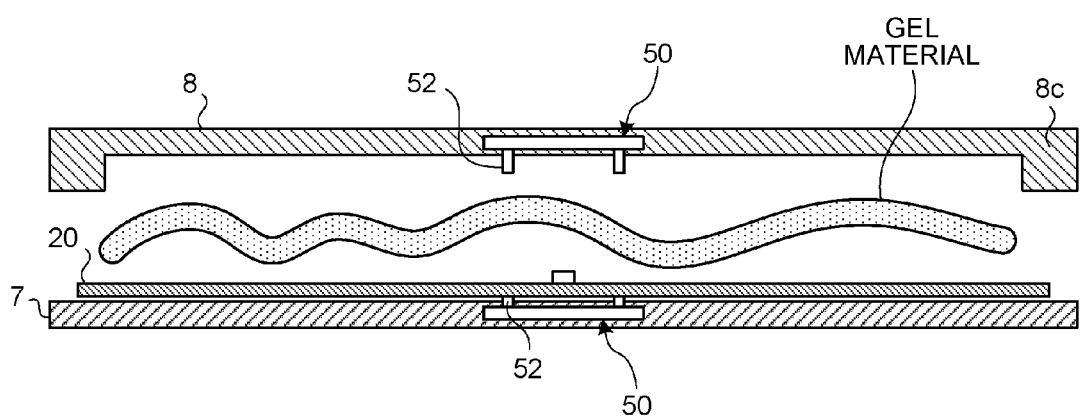

More particularly, as illustrated in FIG. 11, a gel material is filled in the inside part of the hollow space 2 that is formed inside the exterior body 10 by joining the lower exterior plate 7 and the upper exterior plate 8.

Figure 12:
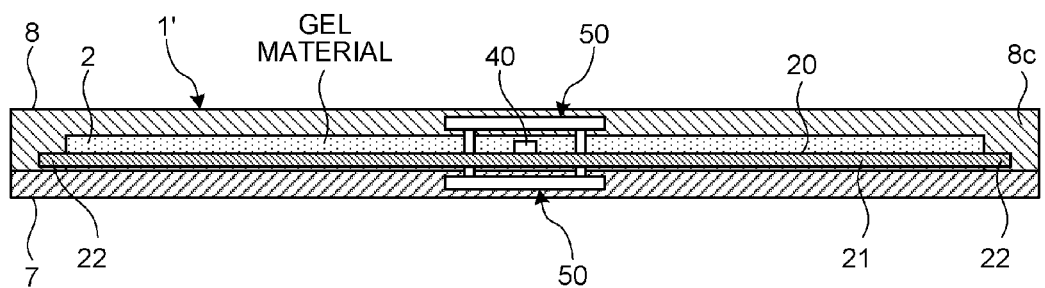

As illustrated in FIG. 12, by performing the abovementioned processes in the manufacturing method of the RFID tag 1, it becomes possible to achieve a configuration in which the inlet 20, which has the antenna pattern 30 mounted thereon, is disposed in the hollow space 2 inside the exterior body 10 filled with a gel material. Thus, even if an external force acts on the RFID tag 1, the bending stress acting on the inlet 20 can be eased up. Hence, the antenna pattern 30 in the RFID tag 1 is prevented from getting disconnected.

Meanwhile, although the present invention has been described with respect to the abovementioned three embodiments for a complete and clear disclosure, the appended claims are not to be thus limited but are to be construed as embodying all modifications and alternative constructions that may occur to one skilled in the art that fairly fall within the basic teaching herein set forth.

That is, in the first embodiment, the inlet 20 is disposed inside the hollow space 2 that is filled with a filling material. Alternatively, the inlet 20 can be disposed inside the hollow space 2 that is not filled with a filling material. Even in that case, in an identical manner to the case when a filling material is filled, an external force that acts on an RFID tag from outside can be eased up without allowing it to act directly on the inlet 20.

According to an aspect of the present invention, it is possible to ease up the bending stress acting on an RFID tag and prevent disconnection of an antenna pattern of an antenna substrate in the RFID tag.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A Radio Frequency Identification (RFID) tag comprising:
    an inlet on which an antenna pattern serving as an antenna for communication and an IC chip electrically connected to the antenna pattern are mounted;
    an exterior body that encloses the inlet from outside; and
    a joining unit that joins the inlet and the exterior body, a hollow space being formed by the inlet and the exterior body and being filled with either one of gas and a gel material.

2. The RFID tag according to claim 1, wherein
    the inlet is positioned at a central part in the hollow space, and
    the RFID tag further comprises a position determining plate that performs inlet positioning to ensure that an outside face of the inlet does not make contact with inside part of the exterior body.

3. The RFID tag according to claim 1, wherein both ends of a main body of the inlet are joined to the inside part of the exterior body.

4. The RFID tag according to claim 1, wherein a plurality of notches is formed across a width direction of the main body of the inlet.

5. The RFID tag according to claim 1, wherein a notch is formed along the periphery of the antenna pattern.

6. A method of manufacturing an RFID tag comprising:
    forming an exterior body in such a way that no end of an inlet constituting an RFID tag is joined to inside part of the exterior body;
    disposing an IC chip in the inside part of the exterior body formed at the forming; and
    filling a hollow space between the inlet and the exterior body with either one of gas and a gel material.

* * * * *